Figure 1:
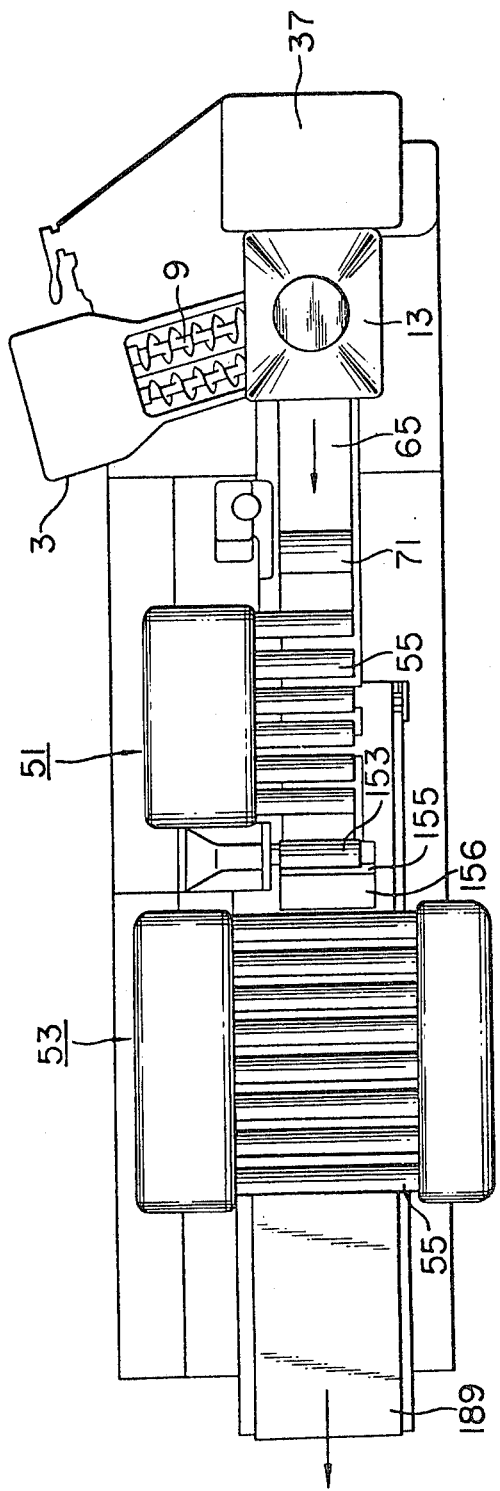

United States Patent [19]

Hayashi et al.

[11] 4,416,910
[45] Nov. 22, 1983

[54] METHOD OF CONTINUOUSLY MANUFACTURING MULTI-LAYERED DOUGH MATERIALS

[76] Inventors: Torahiko Hayashi, 3-4,, Nozawa-machi Utsunomiya-shi Tochigi-ken; Minoru Kageyama, 48-1, Kamitomatsuri-cho, Utsunomiya-shi, Tochigi-ken; Michio Morikawa, 67, 1-chome, Yosai-cho, Utsunomiya-shi, Tochigi-ken, all of Japan

[21] Appl. No.: 183,422

[22] Filed: Sep. 2, 1980

Related U.S. Application Data

[62] Division of Ser. No. 937,967, Aug. 30, 1978, Pat. No. 4,266,920, which is a division of Ser. No. 665,326, Mar. 9, 1976, Pat. No. 4,113,819.

[30] Foreign Application Priority Data

Mar. 10, 1975 [JP] Japan .................................. 50-29355

[51] Int. Cl.³ .......................... A21D 6/00; A23P 1/00
[52] U.S. Cl. ..................................... 426/502; 426/94; 426/283; 426/514; 426/516
[58] Field of Search ............... 426/502, 516, 517, 549, 426/89, 94, 284, 283, 282, 514, 277; 425/133.1, 517, 315; 264/173, 209.1, 210.1

[56] References Cited

U.S. PATENT DOCUMENTS

| | | | |
|---|---|---|---|
| 1,265,853 | 5/1918 | Wiseman | 425/315 |
| 2,501,690 | 3/1950 | Prendergast | 264/173 |
| 2,888,888 | 6/1959 | Jorgenson et al. | 426/502 |
| 3,480,445 | 11/1969 | Slaybaugh | 426/284 |
| 3,544,332 | 12/1970 | Leebens | 426/94 |
| 3,551,161 | 12/1970 | Whitestone | 426/283 |
| 3,608,018 | 9/1971 | Henderson | 426/277 |
| 3,615,147 | 10/1971 | Hayashi | 425/133.1 |
| 3,973,895 | 8/1976 | Hayashi | 425/517 |
| 4,138,503 | 2/1979 | Ziolko | 426/514 |

Primary Examiner—Raymond N. Jones
Assistant Examiner—George C. Yeung
Attorney, Agent, or Firm—Guy W. Shoup; Gerard F. Dunne

[57] ABSTRACT

A method and apparatus for continuously manufacturing multi-layered dough materials containing at least dough layers comprising the steps of continuously extruding material in a tubular form onto a conveyor belt, stretching the material to a thin strip while being transported, folding and piling up the strip of material and re-stretching the piled up material. The apparatus comprises a dough feeder comprising a vertical hollow screw and a double-layered annular bottom outlet, a first conveyor means, a first roller assembly consisting of rollers progressing along a closed orbit, a swinging means positioned between the first and the second roller assemblies for swinging dough material so as to allow it to be riled up on a second conveyor means in a multi-layered form, and a second roller assembly similar to the first roller assembly for stretching the piled up dough material in coaction with the second conveyor means.

1 Claim, 12 Drawing Figures

U.S. Patent  Nov. 22, 1983  Sheet 3 of 9  4,416,910

METHOD OF CONTINUOUSLY MANUFACTURING MULTI-LAYERED DOUGH MATERIALS

This application is a division of copending application Ser. No. 937,967 filed Aug. 30, 1978, U.S. Pat. No. 4,266,920, which is a division of application Ser. No. 665,326 filed Mar. 9, 1976 and now U.S. Pat. No. 4,113,819 granted Sept. 12, 1978.

The present invention relates to an apparatus and a method for manufacturing multi-layered dough materials.

More particularly, it relates to an apparatus and a method for continuously manufacturing multi-layered dough materials consisting of dough or layers of dough and other material overlapping alternately such as pies and Danish pastries.

In the past multi-layered dough products have been produced by various means such as by repeatedly folding a two-layered material, or by overlapping a plurality of layers one above the other.

In order to obtain multi-layered dough products comprising a plurality of thin dough layers, it was necessary in the conventional processes to press the folded or overlapped layers of material by means of a pressing device. On most occasions, pressing has been effected by causing dough material to pass between cylindrical rollers rotating at a fixed position. In such a device, pressure applied is concentrated on the space between the rollers so that dough material tends to adhere to the rollers or is likely to be broken in the pressing process. Thus, there is an inherent limitation as to its efficiency.

Again, there has been no effective device in the past to press and stretch dough material piled up in more than three layers. Thus, in order to obtain a 27-layered dough product, it was necessary to fold a dough sheet in three layers and stretch the three-layered dough material and to repeat this folding-stretching operation two more times. If the above operation was to be performed on a conveyor system, the total length of the folding-stretching device required more than 10 meters, occupying a large operational space.

One of the inventors of the present invention invented in the past a device as disclosed in (U.S. Pat. No. 3,821,452), wherein spherical dough materials each containing a core material other than dough are fed onto a movable base and below a press ram, which compresses the fed materials in synchronization of the feed of the materials so as to produce multi-layered food product.

Another invention invented by the same inventor is disclosed in (U.S. Pat. No. 3,973,895), wherein spherical dough materials each containing a core material other than dough are fed into a guide plate and a roller assembly consisting of a group of rollers freely rotatable about their axes and revolving along a closed orbit, and the materials thus fed are introduced into a space between a horizontal conveyor belt and the lower straight portion of said closed orbit, whereby the materials are stretched and flattened in such a manner that a sheet material consisting of a plurality of horizontal layers of dough and other materials is obtained.

These inventions have resolved the above difficulties in the conventional processes. However, they required manufacture of spherical dough materials comprising core material to produce multi-layered dough materials, and the formation of the layers in the end product was accomplished by compressing said spherical dough materials. In these cases, there was a certain limitation in efficiency deriving from the use of such spherical materials. Further, in the first invention, the compression by the action of a press sometimes tended to injure the tissue of dough. In the second invention, the use of a single stretcher resulted in the difficulty in obtaining a large number of layers in the end product.

All of these difficulties have been eliminated by the process and apparatus of the present invention.

According to the present invention, it is possible to manufacture continuously and automatically multi-layered dough materials containing thirty layers or more of dough or dough and other material orderly arranged therein without injuring the tissue of dough. Further, the present invention has enabled the manufacture of multi-layered dough materials comprising layers of dough and fat or oil such as butter overlapping alternately without the normally expected problem of butter being squeezed our or dough adhering to adjacent machine portions during stretching operation.

In the present invention, a multi-layered dough material can be continuously and automatically manufactured by the combination of the processes of supplying a first hopper with dough and, if required, a second hopper with other material and extruding the fed dough material in a tubular form onto a conveyor; stretching the material; folding it by a swinging means to a required number of layers; and stretching the folded material to a desired thickness.

The extrusion of the dough material in a tubular form is conducted by a dough feeder comprising a vertical screw for feeding dough, a passage, in the axial portion of the screw, for feeding other material, and a double-layered annular outlet at the bottom of the device, wherefrom dough and the other material flow down in the form of a tube wherein dough forms the outer layer and the other material forms the inner layer. In case dough only is fed, a tubular dough without any inner layer is obtained.

The tubular material may be collapsed flat by its own weight on a conveyor which advances substantially horizontally. The flattened material may be stretched to a thin strip of a thickness such as of 2 to 3 mm by a first stretcher comprising a plurality of freely rotating rollers revolving along an elliptical track having a straight bottom portion and a conveying means positioned thereunder. The stretched strip of material coming out of the stretcher may be suspended from the level of the strip of material undergoing stretching operation and slowly swung back and forth guided by a swinging means such as a swinging plate so that it may be folded and piled up so as to partially overlap each other in tens of layers on a continuously travelling conveyor. The piled up multi-layered material may be stretched by a second stretcher, i.e. freely rotating rollers which are revolving along an elliptical track having a straight bottom portion and a conveying means positioned thereunder without destroying the regularity of the layers in the material.

The abovementioned conveying means in each of the first and the second stretchers comprises a plurality of belt conveyors each of which has individual feed speed and are arranged in series in the order of feed speed such that a downstream belt conveyor runs faster than any upstream belt conveyor. The revolving speed of the rollers along the elliptical track is greater than that of the fastest conveyor belt.

The conveyor means may have brush rollers each interposed between any pair of adjacent conveyor belts. The brush rollers, due to the flection of the flexible bristles, can stably transfer dough material to any adjacent downstream conveyor belt while all the flour on the upstream conveyor belt is transferred simultaneously so that the dough material does not adhere to the downstream conveyor belt.

In accordance with the present invention there is provided a method of continuously manufacturing multi-layered dough materials containing at least dough layers, comprising the steps of continuously extruding material in the form of a tube having at least one layer, allowing the tubular material to collapse flat by its own weight on a continuously travelling conveyor, stretching the flattened material to a thin strip, folding and piling up the strip of material to a predetermined number of multi-layers, and re-stretching the piled up material to a desired thickness.

Further, according to the present invention there is provided an apparatus for continuously manufacturing multi-layered dough materials containing at least dough layers, comprisng a dough feeder for continuously extruding material in the form of a tube having at least one layer, a first conveyor means for receiving the tubular material extruded from said dough feeder and conveying it substantially horizontally, a first roller assembly positioned above said first conveyor means for stretching said material in cooperation with said first conveyor means, to a thin strip, a swinging means positioned adjacent to the downstream end of said first conveyor means for swinging back and forth the portion of the dough material leaving the downstream end of said first conveyor means, a second conveyor means having its upstream end positioned below said swinging means for receiving dough material forwarded from said swinging means to allow it to be piled up in a multi-layered configuration and conveying it to a subsequent station, and a second roller assembly positioned above said second conveyor means for stretching the material piled up on said second conveyor means in cooperation with said second conveyor means, to a desired thickness.

It is, thus, an object of the present invention to provide a process which enables to continuously and automatically manufacture dough material comprising dough in a multiplicity of orderly layers.

Another object of the present invention is to provide a process of producing continuously dough material comprising layers of dough and other material such as fat or oil overlapping alternatively.

A further object of the present invention is to provide an apparatus for producing dough sheets in a plurality of layers with or without layers of fat or oil interposed in layers of dough, the working distance of which apparatus is substantially shorter than that necessary for any conventional automatic apparatus of this kind.

A still further object of the present invention is to provide a process and apparatus for continuously producing dough sheets containing layers of oil or fat such as butter without any trouble of oil or fat being squeezed out or dough adhering to adjacent machine portions during stretching operation, with the result that oil or fat may be orderly laminated.

The above and other objects, features and advantages of the invention will be apparent in the undermentioned detailed description.

Figure 2:
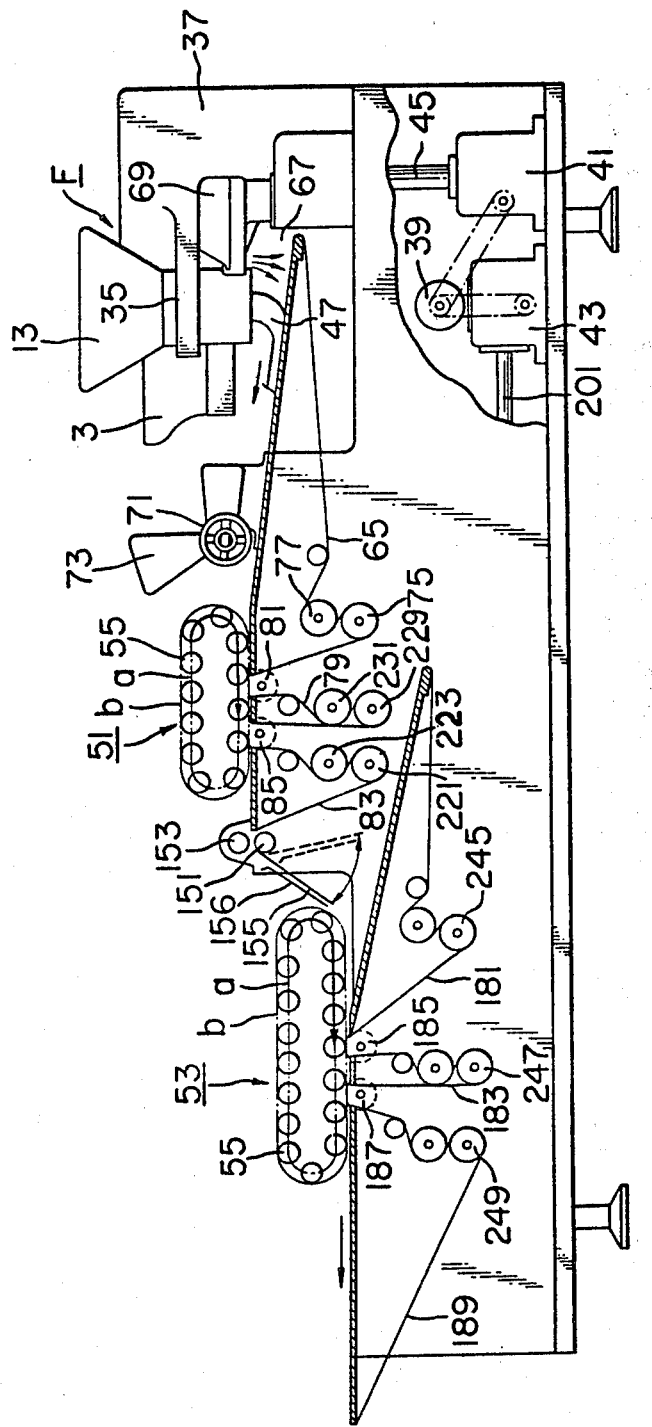
Figure 3:
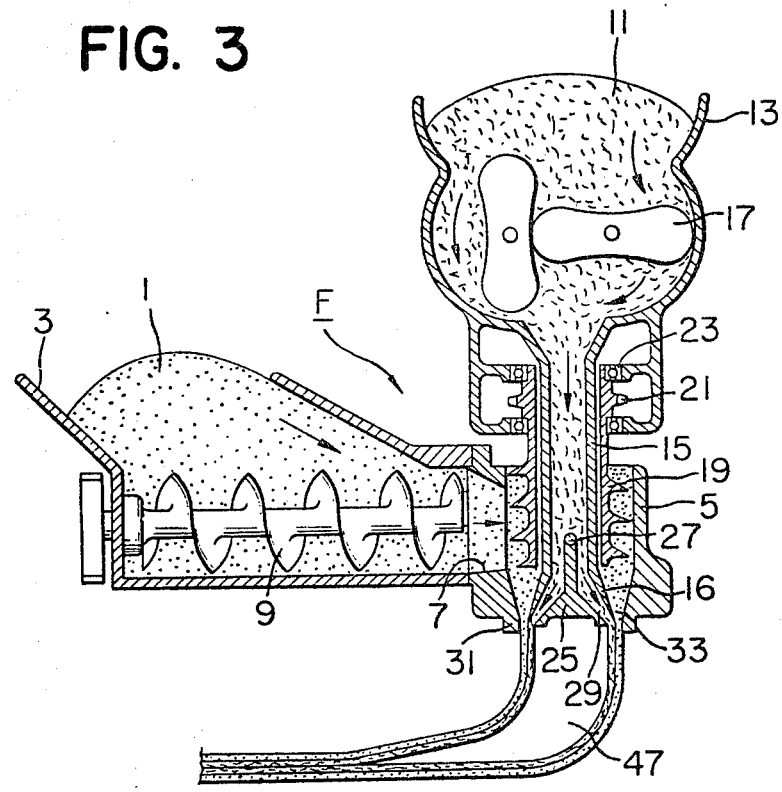
Figure 4:
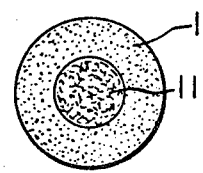
Figure 5:
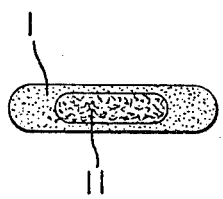
Figure 6:
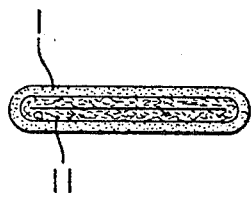
Figure 7:
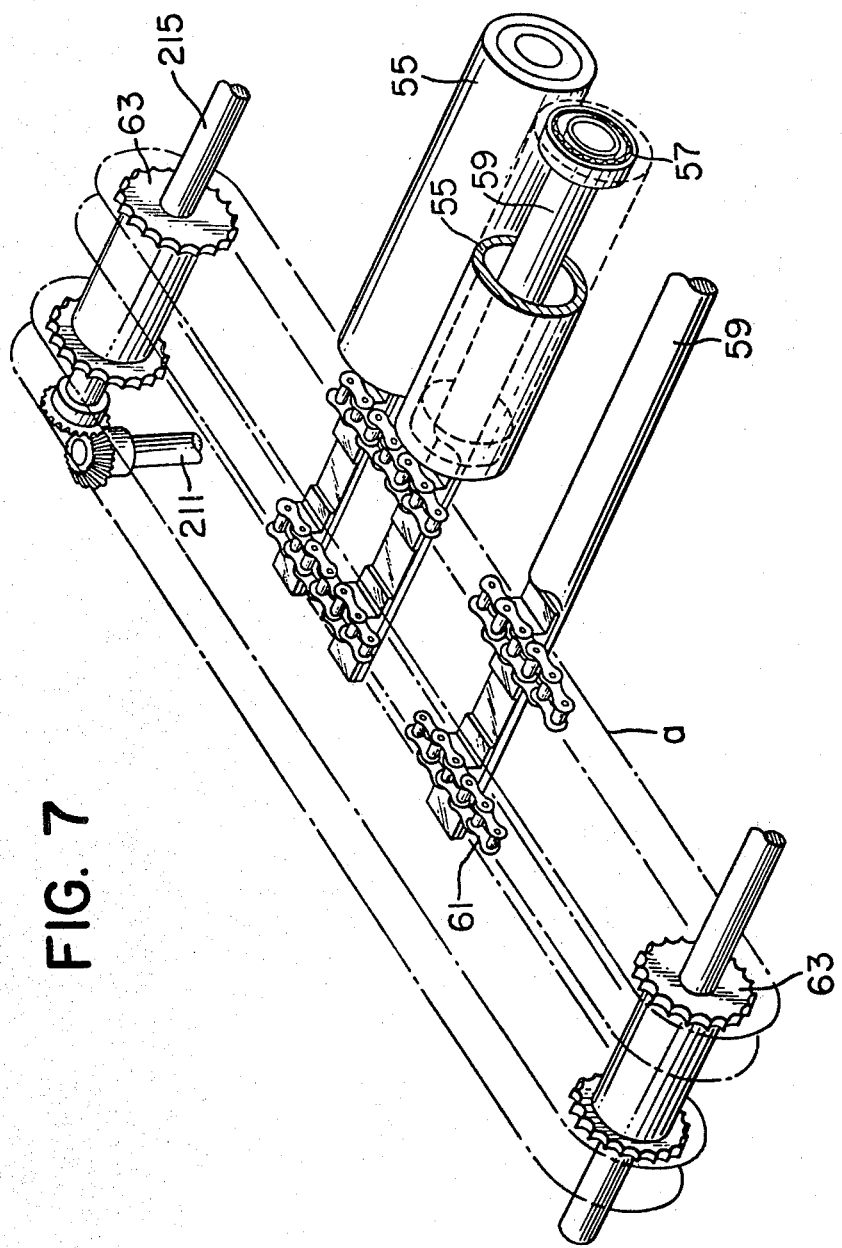
Figure 8:
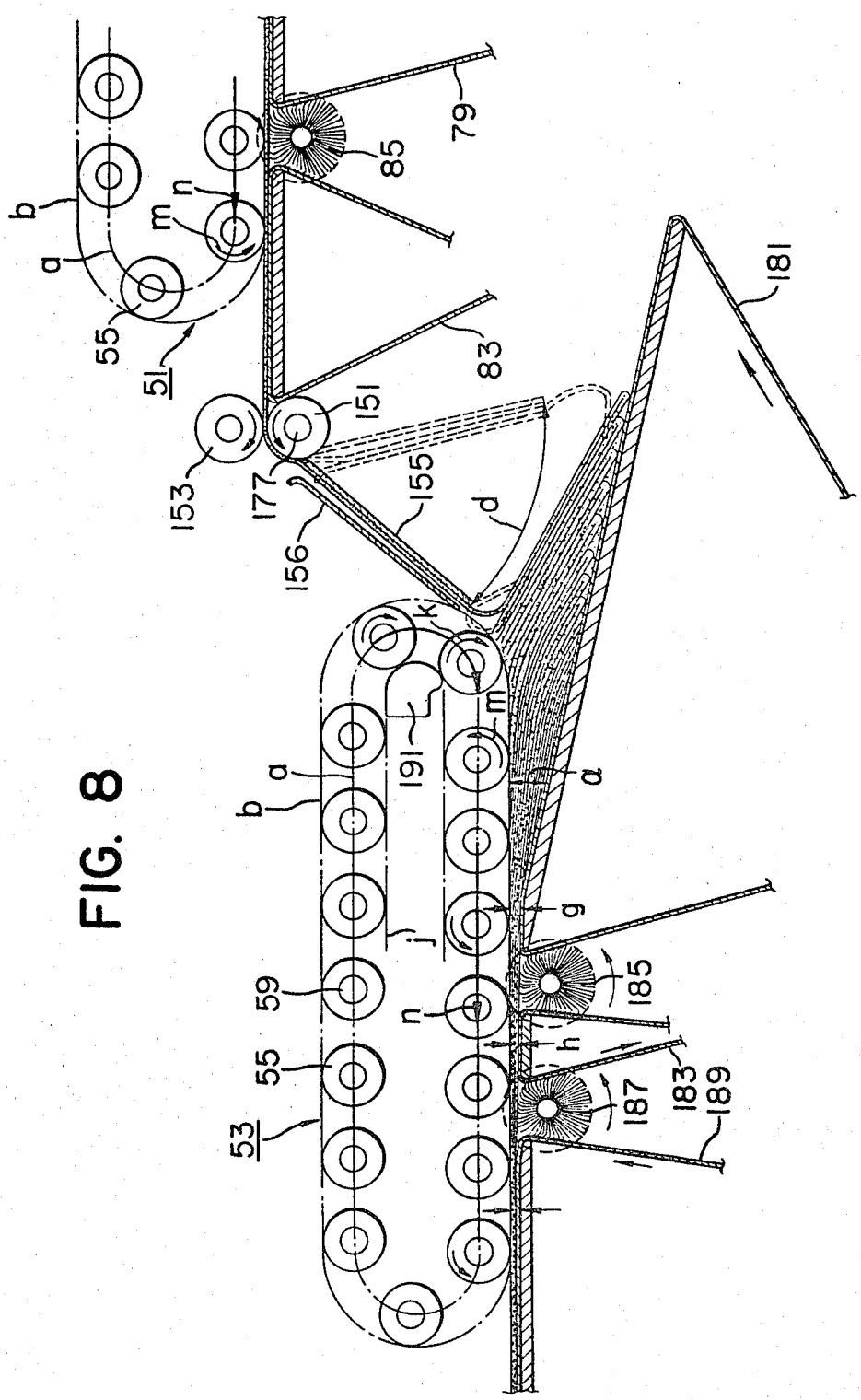
Figure 9:
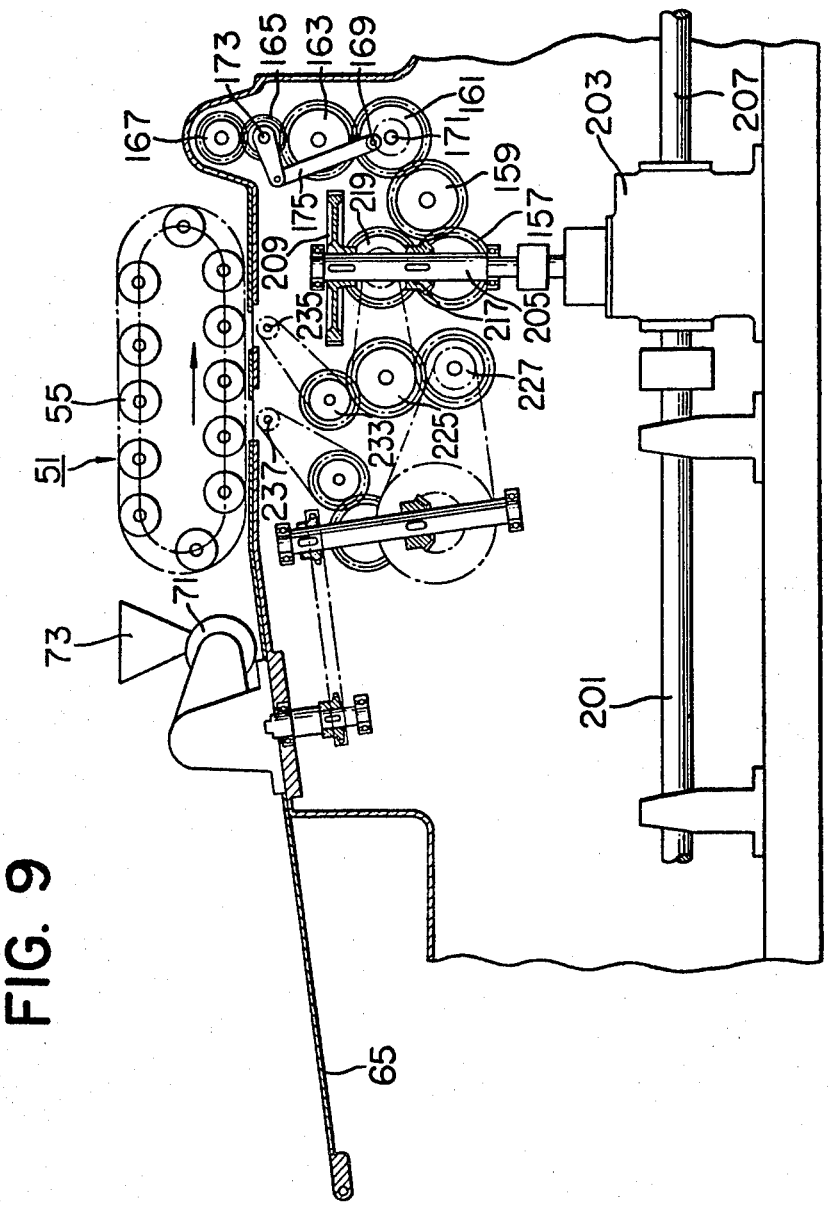
Figure 10:
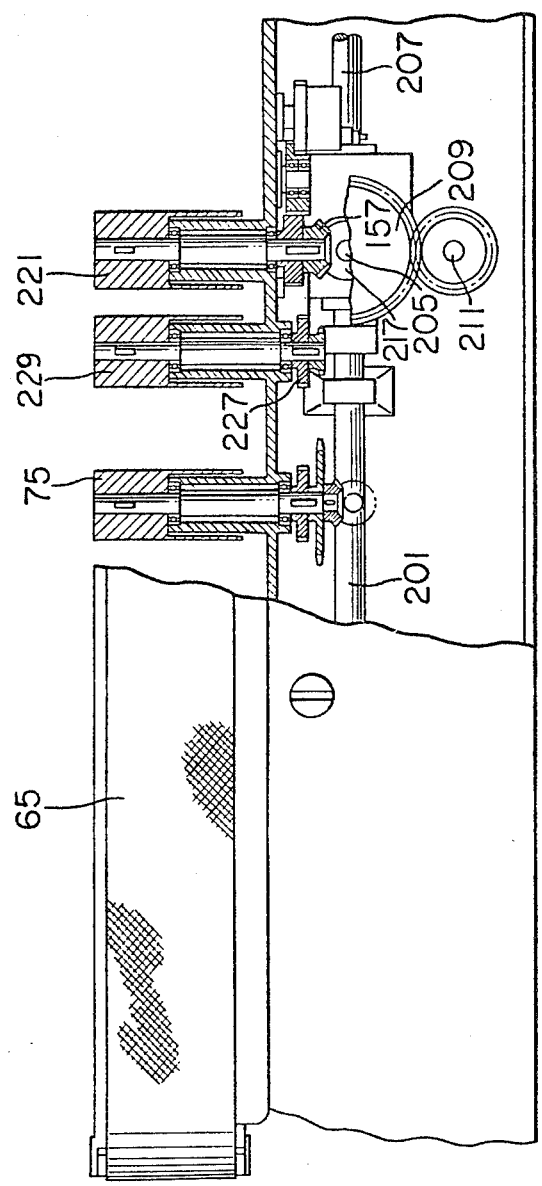
Figure 11:
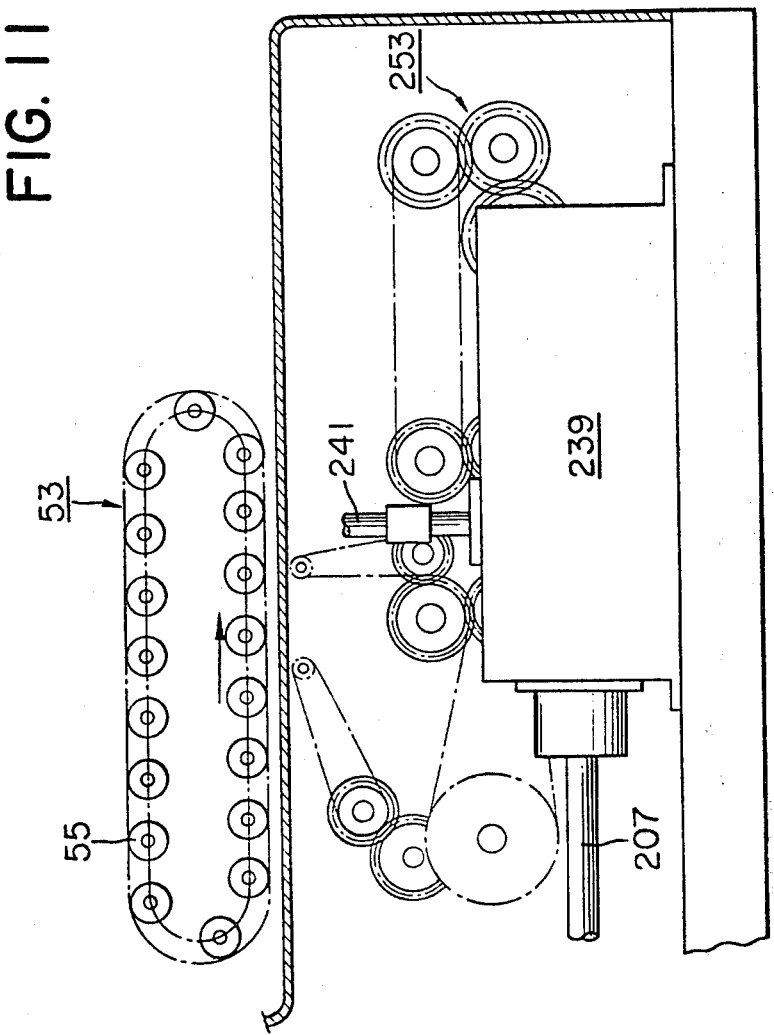
Figure 12:
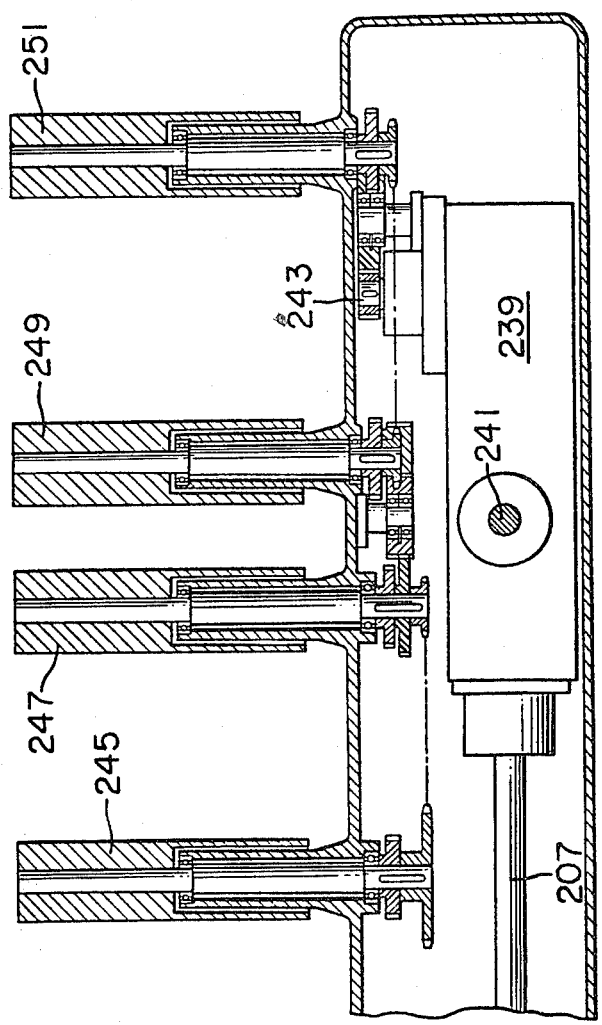

For a better understanding of the invention, reference will now be made by way of example to the accompanying drawings, in which:

FIG. 1 is a diagrammatic plan view of an embodiment of an apparatus according to the present invention, FIG. 2 is a diagrammatic side view, partially broken away, of the apparatus of FIG. 1, FIG. 3 is a cross-sectional side view of a dough feeder to be used in the above apparatus, FIG. 4 illustrates for reference purposes a cross-section of a solid rod consisting of two concentric materials wherein the outer layer consists of dough and the core portion consists of butter, FIG. 5 is a cross-section of a sheet obtained by compressing the solid rod shown in FIG. 4, FIG. 6 is a cross-section of a sheet obtained by flattening a hollow tube having two concentric materials extruded from a dough feeder used in the present invention, FIG. 7 is a perspective view of a roller driving mechanism for the first roller assembly of the apparatus of the present invention, FIG. 8 is a diagram illustrating the operation of a portion of the apparatus according to the present invention, FIG. 9 is a diagrammatic side view, partially in cross-section, of the driving mechanism of a first stretcher and a swinging means of the apparatus, FIG. 10 is a plan view, partially in cross-section, of the same driving mechanism as shown in FIG. 9, FIG. 11 is a diagrammatic side view, partially in cross-section, of the driving mechanism of a second stretcher of the apparatus, and FIG. 12 is a plan view, partially in cross-section, of the same driving mechanism as shown in FIG. 11.

In FIG. 3, dough (1) is supplied into a hopper (3) of the dough feeder (F). Dough (1) consists, in the case of pies, ordinarily of kneaded mixture of wheat flour and water and sometimes contains about 15% sugar. In the case of Danish pastries, the dough consists of a kneaded mixture of wheat, water, yeast fungi, salt and a small amount of butter.

The hopper (3) is fixedly connected to the body portion of the dough feeder (F), and contains therein a feed screw or screws (9) which are disposed at the bottom of the interior chamber of the hopper (3). Dough in the hopper is thus conveyed by the screw or screws (9) into the body portion of the dough feeder (F).

The body portion of the dough feeder (F) comprises a vertical hollow cylinder (5) which forms an outer housing. Said cylinder (5) has a cylindrical hollow portion, wherein a vertical hollow screw (19) is positioned. The cylinder (5) and the screw (19) define an annular space therebetween. An opening (7) is provided on the side wall of the cylinder (5) and the annular space between the cylinder and the screw (19) is directly connected through said opening (7) with the interior chamber of the hopper (3). Thus, dough (1) in the hopper may be fed through the opening (7) into the annular space.

Oil or fat (11), for example, butter for pies and Danish pastries and lard for Chinese cakes, is supplied into a hopper (13) positioned above the body portion of the dough feeder (F). The hopper (13) comprises in its interior chamber pump means (17) for transporting oil or fat downwards and into an inner cylinder (15) positioned below the hopper (13) and connected to the circumference of an opening at the bottom thereof. The cylinder (15) is stationary and arranged within the hollow portion of the screw (19) concentrically therewith. The bottom portion of the cylinder (15) constitutes a nozzle (16). A conical plug (25) is positioned concentrically with the inner cylinder (15) at the bottom part thereof and is suspended from the inner wall of the inner cylinder (15) through a support rod (27) so that an annular orifice (29) may be defined between the plug (25) and the nozzle (16). The lower end portion of the cylinder (5) forms a dough nozzle (31) which is concentric with the annular orifice (29) so that an annular orifice (33) may be defined between the inner nozzle (16) and the dough nozzle (31) in the manner as illustrated in the drawing.

The lower end portion of the nozzle (31) and that of the inner nozzle (16) may be constructed to be detachable from the remainder and may be provided in variety of different sizes so as to be adapted to change the dimentions of the orifices (29) and (33).

A sprocket wheel (21) is secured to the top portion of the hollow screw (19) for the rotation of the screw. The screw may be rotatably held by, for instance, an extension of the hopper (13) through bearing means (23).

A feature of the use in the present invention of a conical plug (25) is that when the diameter of the nozzle (31) is increased, the cross-section of the discharged material may be kept unchanged by adjusting the size of the conical plug (25). It even permits to reduce the ratio of the non-layered part consisting of dough alone at each end as against the layered portion even when the diameter of the nozzle (31) is increased.

In FIG. 2, the dough feeder (F) may be received by a suppprt (35) integral from the frame (37) of the apparatus. The power of a drive motor (39) is transmitted through pulleys to reduction gears (41) of a vertical output spindle type and reduction gears (43) of a horizontal output spindle type simultaneously.

The output spindle (45) of the reduction gears (41) is operatively connected to an input end of the screws (9) to drive them and to the sprocket wheel (21) to rotate the vertical screw (19) so that dough (1) is discharged from the annular orifice (33) continuously in a tubular form.

Further, since the pump means (17) extrudes fat or oil continuously through the annular orifice (29) in a tubular form, it will be readily understood that a dough material may be continuously extruded from the dough feeder (F) in the form of a hollow rod or tube (47) consisting of an outer layer of dough (1), an inner layer of oil or fat (11) and a central hollow portion.

In this regard, it is to be noted that the dough material may be extruded as a hollow rod or tube consisting of only one layer of dough, if required, by feeding dough alone.

In an embodiment, the inner cylinder (15) may not be required. In this instance, the inner nozzle (16) may be provided at the lower portion of the screw (19).

The advantages of the above hollow rod may be explained below. When two strips of dough containing a layer of oil or fat inbetween where oil or fat is exposed at both ends are subjected to stretching action, oil or fat which is softer than dough is forced out of both ends by pressure and adheres to the belt or other parts of the machine, so that a continuous operation sometimes becomes impossible. However, in the present invention no such danger exists since dough envelops the inner material completely.

The advantages of the above hollow rod in comparison with a solid continuous rod as illustrated in FIG. 4 are that compression of dough material is more facilitated and that oil or fat (11) and dough (1), when pressed, form more complete layers as shown in FIG. 6 in comparison with the flattened solid rod as illustrated in FIG. 5, wherein the non-layered parts at the two ends are excessively large and the upper and lower dough portions are too thin. In contrast, what is obtained from the hollow rod as shown in FIG. 6 is superior in the formation of layers to that shown in FIG. 5.

Since the ratio of the amount of dough as against oil or fat to be folded into layers for Danish pastries is generally 1.4:1, when the solid rod is flattened as shown in FIG. 5, the part consisting of dough alone at each end becomes excessively large, and no layer of oil or fat is formed there while the ratio of oil or fat at the central portion remains excessively large even if the material is folded in subsequent steps. This does not give a product suitable for commercial use.

As described above, the dough nozzle (31) and the inner nozzle (16) are each in circular form. If they were in a flattened or rectangular form, since the elevation angles of various portions of the inner face of the nozzles are considerably different from each other because of the required changes in the form of the vertical cylinder (5) and the inner cylinder (15) from the circle at their upper portions to flattened or elongated shape at their lower portions, not only the discharge speed is different between the middle portions and end portions, but also there occurs the destruction of gluten tissue, which does not permit to produce good quality products.

The dough material thus extruded is received by the first conveyor belt (65). The upper surface of the first conveyor belt (65) is strewn with flour (67) by a flour feeder (69) mounted on the frame (37) at a suitable position upstream of the dough feeder (F). Consequently, the dough material is extruded onto the conveyor belt (65) strewn with flour.

The dough material is then carried forward on the conveyor belt (65) to a position where it is pressed prelimirarily by a press roller (71) to a certain extent before it enters the first stretcher.

Above the press roller (71) is disposed a flour hopper (73). Flour in the flour hopper is applied to the upper surface of the dough material through the press roller (71). Such a preliminary treatment is all conducted on the first conveyor belt (65).

Subsequent to the above, the dough material is stretched to a very thin strip and then undergoes folding and restretching operations to form a multi-layered dough product. The number of layers obtainable in the final product is to a large extent dependent upon the thickness of the dough material stretched in the first stretching process.

According to the present invention, the first stretching may be effected by the first stretecher comprising a number of rollers movable on the predetermined elliptical track by means of chains, and a conveying means positioned thereunder comprising a plurality of conveyor belts. The first stretcher comprises the first roller assembly (51) consisting of a number of small rollers (55) mounted through bearings (57) on shafts (59) which in turn are rotatably mounted on chains (61) at equal intervals.

The chains (61) are trained around two sprocket wheels (63), so that they form a flattened or elliptical track (a) on which the small rollers (55) travel along with the rotation of the chains (61). The travel of the outermost points of the small rollers (55) along the elliptical track (a) forms a locus represented by (b) in FIG. 8. The locus (b) has a straight bottom portion facing the conveyor means consisting of a plurality of conveyor belts (65), (79) and (83).

The first conveyor belt (65) extends about 100 mm into the portion adjacent the straight portion of the locus (b) and therebelow.

The dough material is fed into the gap between the lower straight portion of the locus (b) and the upper surface of the upper flight of the conveyor belt (65).

Downstream of the first conveyor belt (65) is arranged a second conveyor belt (79) spaced about 50 mm apart from the first conveyor belt. In the space between the first and the second conveyor belts, a brush roller (81) is disposed. Due to the flection of the flexible bristles the brush roller (81) transfers dough material from the first conveyor belt (65) to the second conveyor belt (79) while all the flour on the conveyor belt (65) is transferred simultaneously so that dough does not adhere to the second conveyor belt (79). The length of the second conveyor belt (79) is preferably 50 to 100 mm. A third conveyor belt (83) is likewise arranged downstream of the second conveyor belt spaced apart about 50 mm from the second conveyor belt. Between the second conveyor belt (79) and the third conveyor belt (83) is disposed a brush roller (85) as illustrated in FIG. 8. The brush roller (85) plays a similar role to that of the first brush roller (81).

The speeds of the first, second, and third conveyor belts (65), (79), and (83) are arranged such that a downstream conveyor moves faster than any upstream conveyor. Similarly, the rotary speed of the second brush roller (85) is higher than that of the first brush roller (81). Since the length of dough material is extended by the stretching operation, it is necessary to vary the speed of each of these conveyors belts and the brush rollers so as to absorb the extension of the dough material.

The upper flight of the third conveyor belt (83) may extend beyond the lower straight portion of the locus (b) after running therebelow about 100 mm.

The space between the first, second and the third conveyor belts and the lower straight portion of the locus (b) becomes continuously narrower in the downstream direction.

It is to be noted that the number of the conveyor belts and the brush rollers is not critical. If the number increases and accordingly the total length of the roller assembly, the capacity of the device may also increase.

A higher stretching capability of the first stretcher enables to reduce the height of the stack of the dough material folded and stacked in the subsequent folding process. Consequently, a finished dough product may contain more layers for a predetermined thickness.

In an experiment, dough material extruded in tubular form and of 20 mm thickness at the entrance of the stretcher could reduce its thickness to 1.5 mm employing the stretcher of the present invention comprising three conveyor belts and two brush rollers inbetween. In the above experiment, the effective operating length of the locus (b) was set at 330 mm, the effective operating number of rollers (55) set at 5, and the revolving speed of the rollers along the elliptical track (a) was set at twice the travelling speed of the third conveyor belt (83).

In contrast, in a conventional stretching employing a pair of cylindrical rollers rotating at a fixed position so as to cause dough material to pass and to be pressed therebetween, the minimum thickness to which dough material containing a large amount of sticky and soft material such as butter can be stretched without breaking the formation of layers in 5 mm. The limitation in the efficiency derives from the fact that pressure applied is concentrated on the surface between the rollers, so that dough material tends to adhere to the rollers or be broken in the stretching process.

The above stretching operation is followed by the process of folding dough material. It is preferable that the stretched dough material is fed through a pair of vertically arranged press rollers (151) and (153) to a swinging plate (155). The press rollers (151), (153) are rotated at a certain speed in order to keep a constant supply of the dough material for folding operation. They suppress whatever elasticity remaining in the stretched dough material. The constant rotation of the rollers (151) and (153) is effected by the engagement of gears (157), (159),(161),(163),(165) and (167) (see FIG. 9). The number of rotation of these rollers (151) and (153) determines in coaction with their diameter the actual amount (length) of dough discharged from them. This amount determines the length (d) of the path of the swinging plate (155) at its lower end and the speed (f) of the swinging motion of the swinging plate (155).

In FIG. 9, a crank pin (169) is mounted on the gear (161) eccentrically to the shaft (171) thereof. To the crank pin (169) is connected a crank rod (175), which in turn is connected to the shaft (173) of the swinging plate (155). The swinging plate (155) is made to conduct rotary oscillation through a crank rod (175) to determine the aforesaid (d) and (f) in relation to the amount of rotation of the rollers (151) and (153). The input to the gear (161) will be explained later.

The roller (151) has a shaft (177) in its central portion. The shaft (177) is hollow and the rocking shaft (173) is inserted therein in such a manner that the movement of the rocking shaft (173) does not interfere with that of the roller (151).

A cover plate (156) may preferably be attached to the swinging plate (155) by suitable means. The cover plate (156) may be substantially parallel to the swinging plate (155) and may have substantially the same length with that of the swinging plate. The cover plate can be removed from the swinging plate for cleaning.

The provision of the cover plate (156) permits the swinging plate (155) to be swung at a greater angle than the case the swinging plate has no cover plate, whereby the length of a layer of the folded dough material can be increased.

The dough material fed from the swinging plate (155) is folded on the fourth conveyor belt (181) positioned below the swinging plate (155) and explained later in further detail, into a continuous stack of a predetermined height by the swinging motion of the swinging plate.

If 2 mm thick dough material is piled up in 30 layers, the height becomes 60 mm. If dough material piled up in as many as 30 layers to such a thickness were subjected to compression by a single roller rotating around a fixed shaft the diameter of the roller should be 1 m or more to conduct the stretching operation without destroying the regularity of the pile, which size is totally impracticable. This is because, at the portion of the roller where it takes up material for compression, the surface of the roller has a tendency to "repel" the material when the height of the material approaches the height of the shaft of the roller.

Thus, the material in the upper part of the pile is repelled from the surface of the single roller so that the regularity of the pile is destroyed and is not taken up by the roller in a regular manner. Such a result is contrary to the object of the present invention.

According to the present invention, loosely folded dough material piled up in 30 layers and having a thickness of 60 mm can be taken up without destroying the regularity of the layers by the roller assembly (53) of the second stretcher. The roller assembly (53) comprises a number of rollers revolving along an elliptical track (a), the take-up end of which has a radius of curvature of only 85 mm.

The fourth conveyor belt (181) which supplies dough material to the second roller assembly (53) may move in substantially the same direction as the third conveyor belt (83), but differs in height.

This difference in height is the sum of the distance of the space in which the swinging plate (155) hanging from the downstream end of the upper flight of the third conveyor belt (83) can swing effectively and the thickness of the dough material stacked thereunder to such a height as that at which the stacked dough material may be stretched by the second stretcher. The fourth conveyor belt (181) is mounted at a position which is compatible with such difference in height.

The upper flight of the fourth conveyor belt (181) extends at its upstream end into the portion below the second and third conveyor belts (79) and (83) so that it receives flour dropping from these conveyor belts. This is effective in preventing dough from adhering to the belt.

The fourth conveyor belt (171) is disposed at an angle with the lower straight portion of the locus (b) formed by the path of the outermost portions of the small rollers (55). In the embodiment illustrated in FIG. 8, the fourth conveyor belt (181) is provided at an angle ($\alpha$), for instance, about 20° relative to said straight portion of the locus (b), which is maintained horizontal. However, it is also allowable that the fourth conveyor belt (181) is horizontal and the straight portion of the locus (b) is inclined relative to the conveyor belt (181). In this way, the angle with which the piled up layers approach the lower straight portion of the locus (b) is increased by the angle (a) over the angles these piles form with the conveyor belt (181). Since the rollers revolve at a faster speed than any of the underlying conveyor belts, the cooperation of the rollers with these conveyor belts efficiently reduces the pile to substantially horizontal parallel layers.

The fourth conveyor belt (181) approaches the lower straight portion of the locus (b) of the second roller assembly (53) at a certain angle ($\alpha$) and moves away from the straight portion of the locus (b) after it comes to a position where it is separated from the locus (b) at a certain distance (g). At a certain interval (experimentally 50 mm), a fifth conveyor belt (183) is arranged downstream of the fourth conveyor belt (181). The distance (h) between the fifth conveyor belt (183) and the straight portion of the locus (b) is smaller than the distance (g). The speed of the fifth conveyor belt is faster than that of the fourth conveyor belt (181). Between the fourth conveyor belt (181) and the fifth conveyor belt (183) is arranged a brush roller (185). Downstream of the fifth conveyor belt (183) is similarly arranged a brush roller (187), and downstream thereof is arranged a sixth conveyor belt (189). The distance (i) between the sixth conveyor belt (189) and the locus (b) is smaller than the distance (h). The speed of the sixth conveyor belt (189) is faster than the speed of the fifth conveyor belt (183). The upstream end of the upper flight of the sixth conveyor belt (189) may extend about 100 mm below and along the straight portion of the locus (b) and the remaining part thereof is outside said straight portion. The leading end of the upper flight of the sixth conveyor belt functions to discharge the finished dough material.

In FIG. 8, a friction plate (191) is disposed at the upstream end of the second roller assembly (53), along the locus (j) formed by the path of the innermost portions of the rollers (55) revolving along the elliptical track (a). The friction plate contacts the small rollers (55), which are otherwise in free rotation, so as to forcibly rotate the small rollers in the direction of the arrow (k) only where the friction plate is in contact with them, elsewhere in the lower straight portion of the locus (b), the small rollers rotate in the direction shown in FIG. 8, i.e., in the direction of arrow (m).

The force created on the surface of the rollers (55) when they rotate in the direction of the arrow (k) acts to increase the action of the rollers to take in the material. It pulls the material in the upper layers of the piled up dough material in the direction of the movement of the conveyor belts and presses it so that it prevents the destruction of the regularity of the layers in the piled up dough material. Thus, all the dough material is led to the linear portion of the locus (b) in a desired manner.

If the speed of progress (n) of the small rollers (55) along the locus (a) is set at 70 times or more the travelling speed of the fourth conveyor belt, the destruction of the order of the layers in the piled up dough material can be prevented without the use of the friction plate (191). However, if the speed of progress (n) cannot be set at such a high speed, the friction plate is required.

When both of the above expedients, namely, the increase of the speed of progress (n) and the friction plate (191), are used in combination, dough material piled up at a greater height can be rolled without trouble.

In an experiment, with the radius of curvature of the locus (b) set at 85 mm, the length of the major axis of the elliptical orbit set at 520 mm, the number of the operating rollers (55) set at 8, and the speed of progress of the rollers along the locus (a) set at 15 times the speed of the sixth conveyor belt (189), the dough material containing butter layers piled up in 30 layers (counting the dough material before folding as a layer) and having a height of 60 mm was stretched to a thickness of 3.5 mm, wherein thin layers of butter were arranged without any disorder.

Turning to the driving mechanism, the rotation of the motor (39), as illustrated in FIG. 2, is transmitted to reduction gears (41) and (43) simultaneously, and the output spindle (45) of the reduction gears (41) is operatively connected to the dough feeder (F). In FIGS. 9 and 10, the output spindle (201) of the reduction gears (43) is operatively connected to a bidirectional output bevel gear box (203), the output of which is conveyed through spindles (205) and (207) (FIG. 9).

The spindle (205) rises vertically to rotate a gear (209) which in turn rotates a shaft (211) through a gear (213) (FIG. 10). The shaft (211) rotates the drive shaft (215) of the first roller assembly (51) through bevel gears (FIG. 7). In FIG. 9, bevel gear (217) fixed on the middle of the shaft (205) transmits power to the rollers (151) and (153) by rotating the gears (157), (159),(161),(163),(165) and (167), and simultaneously the swinging plate (155) through the crank pin (169), crank rod (175) and the shaft (173) of the swinging plate.

The gear (157) also engages with a gear (219) to rotate the input rollers (221) and (223) of the third conveyor belt (83). The rotation of the gear (219) is transmitted through a chain to a gear (225) which engages with a gear (227) to rotate the input rollers (229) and (231) of the second conveyor belt (79). The gear (225) engages also with a gear (233) which transmits the rotation through a timing belt to the shaft (235) of the brush roller (85).

A power transmission system divided out from the gear (227) performs the drive of the input rollers (75) and (77) of the first conveyor belt (65), the drive of the shaft (237) of the brush roller (81), and transmits the input to the press roller (71).

The spindle (207) extending from the bevel gear box (203) enters a gear box (239) wich has two output shafts (241) and (243) (FIGS. 11 and 12). The output shaft (241) rises vertically to drive the second roller assembly (53), and the other output shaft (243) extends laterally to rotate the imput rollers (245), (247), (249) of the fourth, fifth, and sixth conveyor belts, respectively, and the brush rollers (185) and (187).

A roller (251) and gears (253) may be provided for transmitting power to a further conveyor not shown.

Although preferred embodiments of the present invention have been illustrated and described, it will be apparent to those skilled in the art that various changes and alterations may be made therein without departing from the spirit of the invention and the scope of the appended claims.

What is claimed is:

1. A method of continuously manufacturing a strip of layered food material, comprising the steps of feeding continuously a plurality of food materials in the form of a hollow tube consisting of concentric layers of said food materials, transferring said hollow tube onto a continuously driven conveyor and collapsing said tube flat by its own weight on said conveyor, the outer layer of said food material being formed of a dough material and another food material forming an inner layer.

* * * * *